Figure 1:
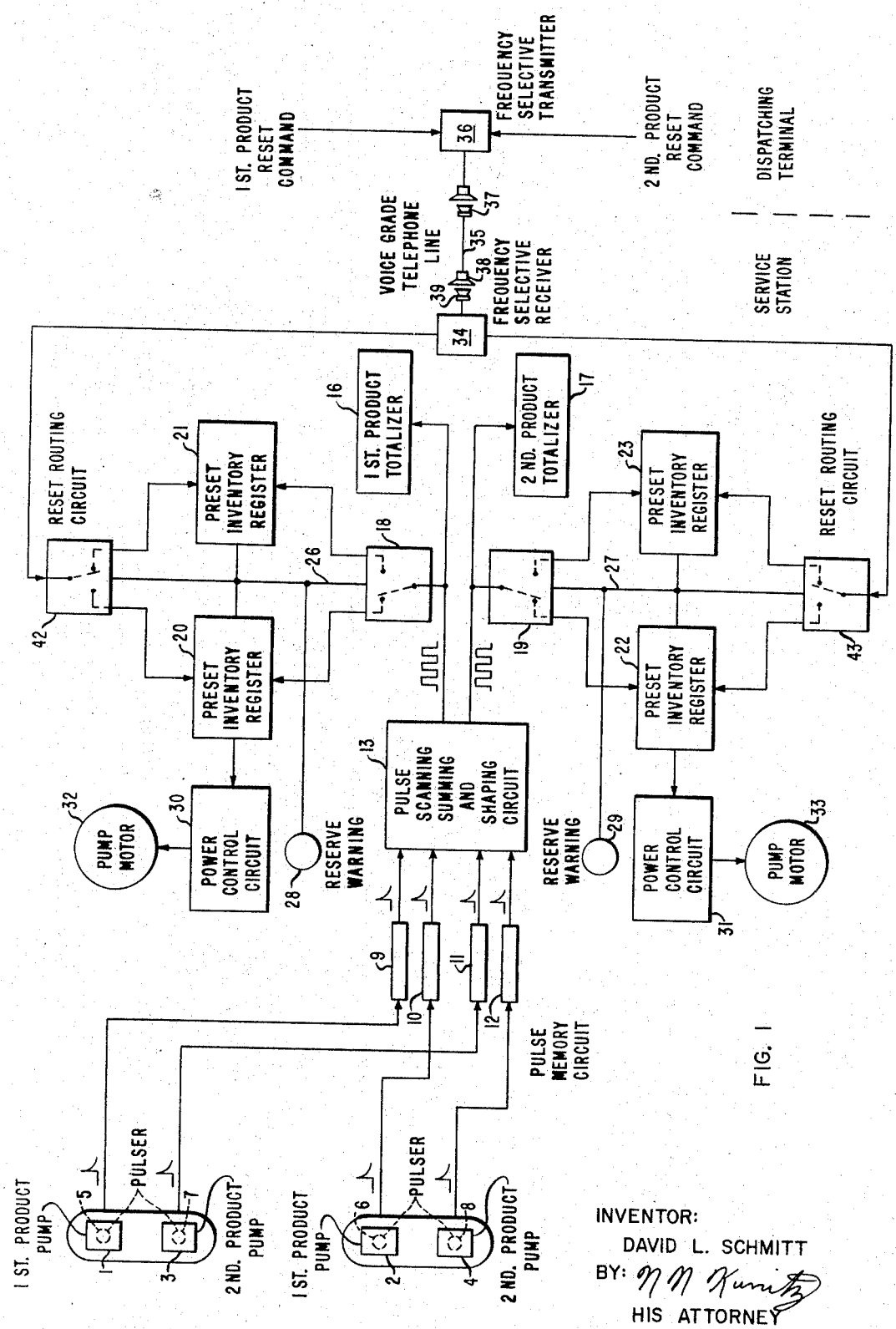

April 4, 1967     D. L. SCHMITT     3,312,812
INVENTORY CONTROL SYSTEM
Filed May 29, 1963     3 Sheets-Sheet 1

INVENTOR:
DAVID L. SCHMITT
BY: HIS ATTORNEY

April 4, 1967 D. L. SCHMITT 3,312,812
INVENTORY CONTROL SYSTEM
Filed May 29, 1963 3 Sheets-Sheet 2

INVENTOR:
DAVID L. SCHMITT
BY: N. N. Kunitz
HIS ATTORNEY

INVENTOR:
DAVID L. SCHMITT
BY: N N Kunitz
HIS ATTORNEY

United States Patent Office 3,312,812
Patented Apr. 4, 1967

3,312,812
INVENTORY CONTROL SYSTEM
David L. Schmitt, Indianapolis, Ind., assignor to Shell Oil Company, New York, N.Y., a corporation of Delaware
Filed May 29, 1963, Ser. No. 284,050
11 Claims. (Cl. 235—151.34)

This invention pertains to a remotely controlled product sales device. More particularly, this invention relates to a remotely controlled product sales device for automobile service stations whereby the product, e.g. gasoline, stored in the service station storage tanks remains the property of the product marketing company until released to the dealer by a marketing company dispatcher.

Conventionally, the product in the service station storage tanks is delivered by product marketing company owned trucks in quantities specified by the service station dealer and becomes the property of the service station dealer as soon as it is placed in the tanks. This conventional method of delivering product to the individual service stations has resulted in a number of practices which are detrimental to the economic welfare of the product marketing company. Some of these problems are the practice of a few unscrupulous dealers of purchasing products from sources other than the marketing company whose name appears on the station, and the down grading of products, i.e. shifting regular gasoline to the super gasoline tanks, to improve the dealers profit margin. The largest problem, however, facing the product marketing company has been the increased cost of delivering the product to the individual service stations.

Under conventional methods of product sales, relatively small purchases of product by the service station dealers have been experienced due to the limiting financial condition of dealers. An average value for these small quantity purchases is approximately one-fourth of the maximum available tank storage capacity at each station which results in the trucking cost involved in transporting the product to the station tanks being effectively quadrupled. Furthermore, since the products can only be delivered during the hours that the station is open, an excessively large fleet of trucks must be maintained by the marketing company in order to provide proper service to the individual dealers.

Since it is both impractical and impossible to require the dealers to purchase products in larger quantities, an obvious solution to the problem is to have the products in the service station storage tanks under the direct control of the marketing company which would then release quantities of product to the service station dealer as required. Such a setup would permit the company to deliver full truck loads of gasoline to the service station tanks at the discretion of the company and on a twenty-four hour basis; thus reducing the cost of transporting the gasoline to the individual stations. The dealer, meanwhile, may still continue to purchase in small quantities and, in fact, may even purchase in smaller quantities than was previously his custom or than was practical under conventional product marketing methods.

A number of systems for carrying out this solution to the transportation problem have previously been suggested. These systems have, however, been found to be unsatisfactory due to their high cost of basic equipment and installation and the complexities involved in providing product releases, e.g. the periodic unlocking of the control equipment by a marketing representative or the use of a coded signal by the service station operator. It is therefore a primary object of this invention to provide an improved service station inventory control system.

It is a further object of this invention to provide a service station inventory control system which is fully automatic and remotely controlled by the product marketing company.

It is still a further object of this invention to provide a product inventory control system which will only permit the withdrawal of a preset quantity of product from a storage area and then will automatically become disabled.

It is another object of this invention to provide an inventory control system which when it has become disabled may be automatically reset from a remote location.

Briefly, these objects are achieved by providing at the service station an inventory control system which will release preset quantities of product from the service station storage tanks to the dealer when actuated by a signal of a predetermined frequency. Whenever the dealer required the release of a quantity of product he merely sends a check for the purchase to the product marketing company. The company bulk terminal dispatcher, upon receipt of the product payment, contacts the dealer by telephone and initiates the proper product release frequency which is audibly transmitted via the telephone circuit to the inventory control system. The inventory control system after a specified time delay then automatically releases the preset quantity of product. The system is further provided with an indicator to inform the dealer when his quantity of prepaid product is nearly exhausted and with control circuitry to de-energize the service station pumps when the prepaid quantity of product has actually been exhausted.

Figure 2:
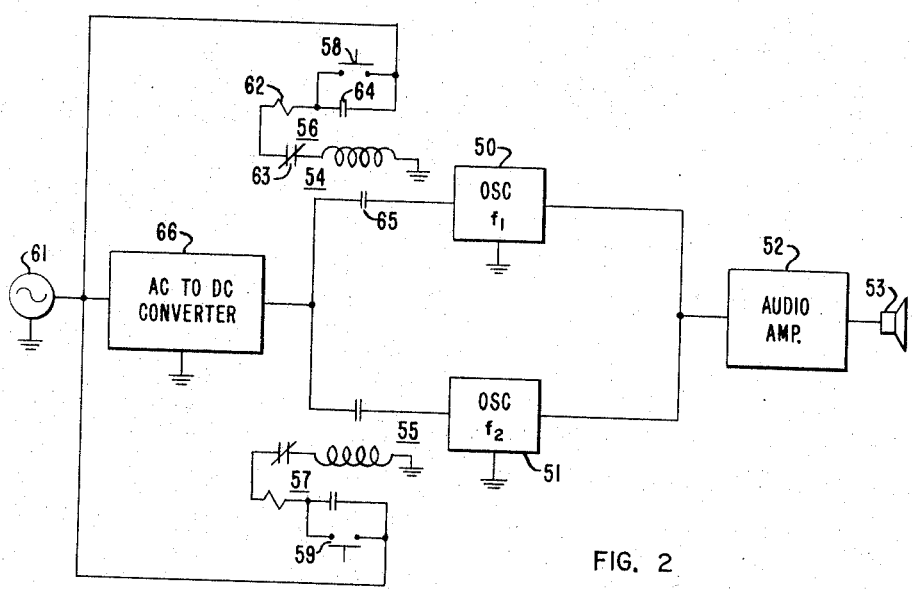
Figure 3:
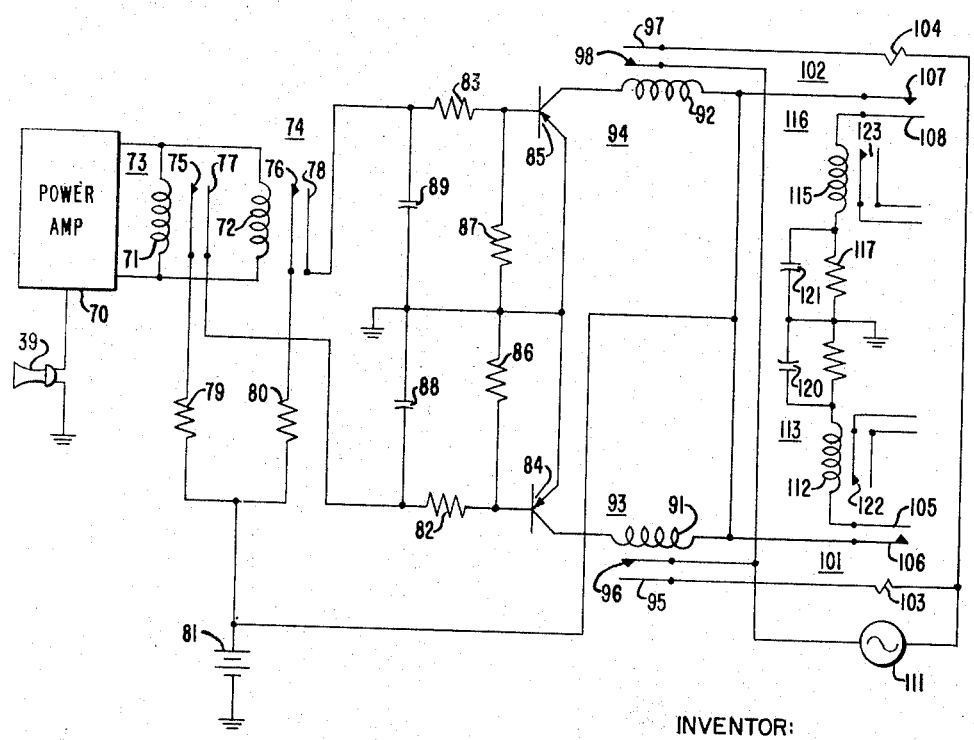
Figure 4:
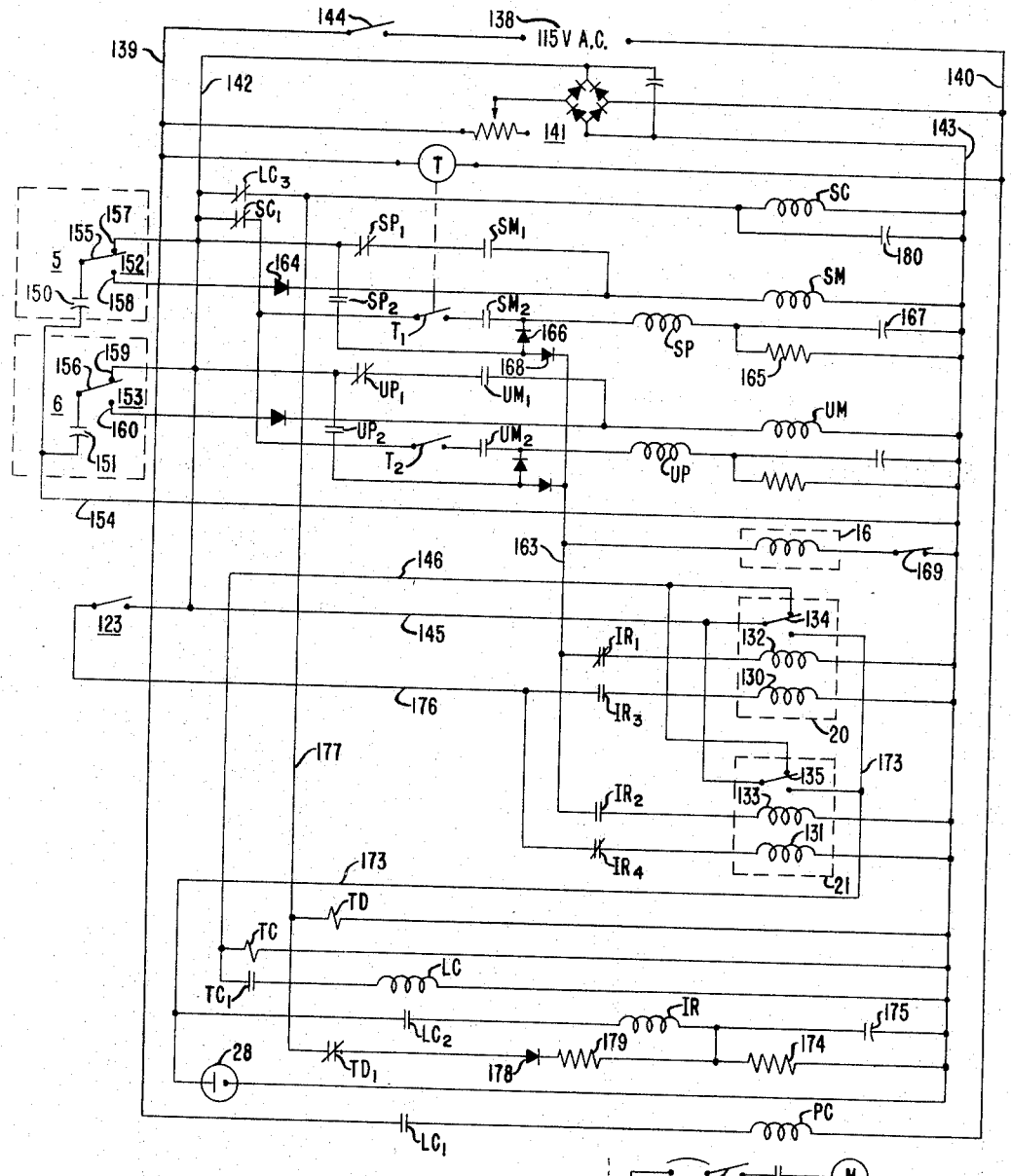

These and other objects and advantages of this invention will be more easily understood from the following detailed description of the invention when taken in conjunction with the attached drawings wherein:

FIGURE 1 is a block diagram of the invention;
FIGURE 2 is a drawing showing one form of frequency selective transmitter which may be used;
FIGURE 3 is a drawing of one form of frequency selective receiver which may be used; and,
FIGURE 4 is a schematic diagram of the service station inventory control system for a single product.

Referring now to FIGURE 1 there is shown a block diagram for a service station inventory control system for two grades or types of product, i.e. regular and super gasoline, with two pumps for each grade of product. Although the system is shown for only two products and with two pumps for each product, it is understood that the system is not limited to these numbers but that they are only shown by way of example.

Attached to each of the pumps 1–4 in the service station is a pulse generating device 5–8 which provides a pulse for each unit, e.g. one gallon, of gasoline delivered from the pump to the consumer. These pulses are transmitted via individual wires to the central control unit for the service station which is located inside the service station building in close proximity to a telephone. Each of the pulses produced by the pulses 5–8 are individually received and stored in a separate pulse memory circuit 9–12. Connected to the pulse memory circuits 9–12 is a pulse scanning circuit 13 which sequentially scans the pulse memories 9–12 at a rate faster than the minimum time between pulses from any single pulse generating device 5–8. At the time of scanning, any pulses in the memories 9–12 are removed and the pulses corresponding to each product are serially transmitted to respective product totalizers 16, 17. This parallel to serial conversion of the meter pulses eliminates the possibility of losing any pulses due to the simultaneous transmission of pulses of a single product. The product totalizers 16, 17 indicate the total volume of a particular product sold by the station. The individual product output pulses from the scanning circuit 13 are also directly transmitted to respective pulse routing circuits 18, 19 which, depending on their condition, will direct the pulses to the correct inventory register 20, 21 or 22, 23, respectively. The registers 20–23 are preset to a particular value and are then stepped one unit for each pulse received. In the preferred embodiment the registers 20–23 are of the type which are set to predetermined count and which then subtract one unit for each pulse received until the count is reduced to zero. Registers of this type are preferred since they have the advantage that the service station operator, by merely observing the count on the registers, can immediately ascertain the amount of prepaid product remaining in the tanks. It is understood however, that totalizing registers which add one unit for each pulse received until a predetermined count is reached, may be used.

Since pulses must only be directed to a register which has a numerical total other than zero, the condition of the registers 20, 21 and 22, 23 is used to control the pulse routing circuits 18, 19, respectively. For example, when the register 20 is reduced to a zero count, the register generates a pulse via conductors 26 which switches the condition of the pulse routing circuit 18 to direct the pulses from the scanning circuit 13 to register 21. Pulse routing circuit 19 is similarly controlled by registers 22 and 23. Each pair of registers 20, 21 and 22, 23 is also provided with a reserve warning light 28, 29, respectively, which are controlled by the registers and are energized whenever any of the registers of a respective pair of registers is reduced to a zero count. Also connected to each pair of registers 20, 21 and 22, 23 is a power control circuit 30, 31, respectively. Whenever both registers of any one pair of registers are reduced to a zero count, the corresponding power control circuits 30, 31 de-energizes the pump motor 32 or 33 corresponding to the product being metered by the exhausted pair of registers. No further sales of this particular product can then be performed until one of the registers of the exhausted pair of registers is reset in a manner to be explained below.

To enable the resetting of an exhausted register and thereby a release of the product from the service station storage tanks, a frequency selective receiver 34, a telephone circuit 35 and a frequency selective transmitter 36 are incorporated in the system. Upon receipt of payment from the dealer, the marketing company dispatcher calls the dealer on the telephone and initiates a signal of a predetermined frequency. A separate and distinctive frequency signal is provided for every grade of gasoline involved. This frequency signal is the reset command for the particular pair of inventory registers 20, 21 or 22, 23 which at that time reads zero. To provide these release commands, the frequency selective transmitter 36 emits an audible tone signal of approximately ten second duration into the mouthpiece 37 of an ordinary telephone. The signal is then transmitted via telephone line 35 to the earpiece 38 of the telephone at the service station which has been placed in close proximity to a microphone or induction pickup coil 39 which is the input to the frequency selective receiver 34. The frequency selective receiver 34 detects the particular frequency being transmitted and produces a reset pulse which is directed to the proper register by the respective reset routing circuits 42, 43. The reset routing circuits 42, 43 are controlled simultaneously and alternatively with the pulse routing circuits 18, 19 by the inventory registers 20, 21 and 22, 23 respectively. As shown in the drawing, at any given instant the pulse routing circuits 18 and 19 and the reset routing circuits 42 and 43 corresponding to a pair of inventory registers 20, 21 and 22, 23 are connected to alternate registers of the pair. This provides the alignment of one register in each pair for counting and the other register of the pair for the acceptance of a reset or release pulse from the frequency selective receiver 34.

Referring now to FIGURE 2 of the drawings in which is shown an embodiment of the frequency selective transmitter 36. The transmitter for the system shown in FIGURE 1 consists basically of a pair of normally unenergized stable oscillators 50, 51, which when energized oscillate at frequencies $f_1$ and $f_2$ respectively. The individual frequencies $f_1$ and $f_2$ correspond to the frequency signal necessary to reset the registers of a particular product at the service station. The outputs of each of the oscillators 50, 51 is connected through an audio amplifier 52 to a loud speaker 53. Each of the oscillators 50, 51 is provided with a power control circuit consisting of a relay 54, 55, a delay relay 56, 57 and a push button switch 58, 59 respectively. In order to energize one of the oscillators, e.g. oscillator 50, the marketing company dispatcher closes the switch 58. Closure of switch 58 applies power to the relay coil 60 of relay 54 from the A.C. power source 61 through the delay element 62 and the normally closed contacts 63 of the delay relay 56; thus energizing relay 54 and closing normally open contacts 64 and 65. Closure of contacts 65 connects D.C. power from the A.C. to D.C. converter 66 which may, for example, be a full wave rectifier, to the oscillator 50, thereby energizing oscillator 50. Closure of the contact 64 locks the relay 54 in an energized position for a period of time equal to the delay time (e.g. ten seconds) of the delay relay 56; at which time the delay relay 56 is energized thereby opening contacts 62 and disconnecting the A.C. power source 61 from the relay coil 60. Once the relay coil 60 is de-energized, the contacts 65 are opened, resulting in the oscillator 50 being de-energized.

Referring now to FIGURE 3, there is shown a drawing of the frequency selective receiver 34. Any signals transmitted over the telephone line 35 of FIGURE 1 are picked up by the microphone or induction pickup 39, amplified in power amplifier 70 and applied across the parallelly connected relay coils 71, 72 of a pair of resonant reed relays 73, 74 respectively. Each of the relays 73, 74 is very sharply tuned to only one of the frequencies $f_1$ or $f_2$ transmitted by the transmitter 36. Each of the resonant relays 73, 74 also contains a stationary contact 75, 76 and a vibrating reed contact 77, 78 respectively. The stationary contacts 75, 76 are connected through respective resistors 79, 80 to the positive terminal of a source of direct current potential 81. It is understood, however, that in other suitable arrangements, the polarity of direct current power supply might be reversed. The vibrating reed contacts 77 and 78 are also connected through respective resistances 82 and 83 to the base electrode of transistors 84 and 85, respectively. The transistors 84 and 85 are normally maintained in a non-conducting condition by means of resistors 86 and 87 which are connected between the respective base electrodes of transistors 84 and 85 and ground and bias the transistors to cut-off. Capacitors 88 and 89 are connected between vibrating contacts 77 and 78, respectively, and ground to protect the contacts of the resonant reed relays 73 and 74 and to smooth out the voltage applied to the bases of transistors 84 and 85. The collectors of transistors 84 and 85 are connected through relay coils 91, 92 of relays 93, 94 respectively to the positive terminal of direct current source 81. The emitters of transistors 84 and 85 are connected to ground. Since the transistors 84 and 85 are normally non-conducting, an open circuit normally exists in the power circuit for the relays 93, 94. Energization of one of the resonant reed relays 73, 74 will however, connect the base electrode of its respective transistor 84, 85 to the positive terminal of direct current source 81, causing the thus connected transistor to conduct and complete the power circuit through the particular one of the relays 93, 94 connected to the collector of the transistor. Each of the relays 93, 94 has a pair of normally open contacts 95, 96 and 97, 98 respectively, the closure of which will energize the output control circuitry of the frequency selective receiver 34.

The output control circuitry of the frequency selective receiver 34 consists of a pair of delay relays 101, 102. Each of the delay relays 101, 102 include a delay element 103, 104 and a pair of normally open contacts 105, 106 and 107, 108 respectively. Each of the delay elements 103, 104 is connected in series with a respective pair of relay contacts 95, 96 and 97, 98 across a source of A.C. power 111. The contacts 105, 106 of delay relay 101 are connected in series with the relay coil 112 of relay 113 and a resistor 114 across the source of potential 81. Likewise a series circuit consisting of relay contacts 107, 108, relay coil 115 of relay 116 and resistor 117 is connected across the source of potential 81. Across each of the resistors 114, 117 is connected a capacitor 120, 121 respectively, for the purpose of de-energizing the relays 113, 116 after a period of time dependent on the time constant of the circuit. Each of the relays 113, 116 has a pair of normally open relay contacts 122, 123, respectively, closure of which will initiate the proper reset function in the registers 20–24 of FIGURE 1.

If a signal of the proper frequency to reset one of the registers 20–23, e.g., $f_1$, is detected by the microphone or induction pickup 39, one of the resonant reed relays, e.g. relay 73, is energized, closing relay contacts 75, 77, energizing transistor 83 which in turn energizes relay 93. Closure of relay contacts 95, 96 connects A.C. power from source 111 to the delay element 103 of delay relay 101 which, after a period of time, e.g. five seconds, closes contacts 105, 106 and thereby energizes relay 113 and initiates the desired reset control function. As soon as the contacts 105, 106 have closed, the capacitor 120 begins to build up a charge which, after a period of time, biases the relay coil 112 to such a value that it is de-energized. Since the delay relays 101 and 102 require a signal of approximately five seconds duration, the system does not respond to spurious noise signals of the preset frequency. The five second delay in the response of the system to the control signal in combination with the sharply tuned resonant relays also makes it very difficult for unauthorized persons to affect a release of product. It should also be noted that the output control circuitry of the frequency selective receiver in conjunction with the reset routing circuit 42, 43 only produces an output pulse for the first input pulse received thereby eliminating the possibility of releasing a number of preset quantities of product by the transmission of a series of release pulses of the preset frequency.

Referring now to FIGURE 4 of the drawings in which is shown a schematic diagram of the control circuitry for controlling one product at the service station, it being understood that the control circuitry for each product to be controlled is the same. In the drawing, the system is shown in a de-energized state. Each of the registers 20 and 21, an addition to a mechanical counter (not shown), contains a reset coil 130, 131 and a counting coil 132, 133 respectively. Additionally each of the registers 20 and 21 contains, respectively, a two position or single pole, double throw switch 134, 135. The corresponding contacts of switches 134 and 135 are connected together. The position of each of the switches 134, 135 is controlled by the mechanical counter mechanism in the respective registers 20, 21. As shown, the switches 134, 135 are in their raised positions indicating that the registers have a count other than zero. Whenever one of the registers reaches a zero count, the counter mechanism changes the position of its respective switch to the lower position.

Power for the control circuitry is supplied from a source of A.C. voltage 138, through a pair of bus bars 139, 140. Connected in parallel across the source 138 are a full wave rectifying circuit 141, a continuously running timing motor T and a pump control relay coil PC in series with a pair of relay contacts $LC_1$. All of the remaining circuitry is connected across the full wave rectifying circuit 141 by means of bus bars 142, 143.

In order to place the system in a condition to enable the delivery of gasoline to the consumer, power must first be supplied to the pump motors 32. Once the power from A.C. source 138 is applied to the system, i.e., switch 144 is closed, D.C. current flows from the bus bar 142 through conductor 145, register switches 134, 135, conductor 146 and delay relay element TC to the bus bar 143. After a short period of time the delay relay element TC will have heated up sufficiently to close contacts TC, connecting relay coil LC to the conductor 143, and thereby energizing relay coil LC and closing contacts $LC_1$. Closure of contact $LC_1$ connects the pump control relay coil PC across the A.C. bus bars 139, 140; resulting in the closing of relay contacts $PC_1$ and $PC_2$ which then permits the pump motors 32 to be energized through their respective pump switches 149.

Each of the pulsers 5, 6 consists of a capacitor 150, 151 and a single pole, double throw switch 152, 153 respectively. One end of each of the capacitors 150, 151 is connected to the bus bar 143 via conductor 154. The remaining end of each of the capacitors 150, 151 is connected to the common movable contacts 155, 156, respectively, of respective switches 152, 153. Switches 152 and 153 also contain stationary contacts 157, 158 and 159, 160 respectively. The movable contacts 155, 156 are respectively normally biased, i.e., by suitable springs, to remain in contact with stationary contacts 157, 159 which are connected to the D.C. bus bar 142. When the switches 152 and 153 are in their normal position, the capacitors 150, 151 are charged to the value of the D.C. voltage of bus bar 142. Each time a unit of gasoline is delivered to a consumer through the service station pumps, a cam (not shown) on the pump computer of the particular pump delivering the gasoline rotates and momentarily reverses the position of its respective movable switch 152 or 153, i.e., close either the contacts 155, 158 or the contacts 156, 160. Closure of contacts 155, 158 or 156, 160 connects the particular charged capacitor 150 or 151 across its respective memory relay coil SM or UM and energizes the relay coil. Each of the memory relay coils SM and UM when energized, conditions its respective pulsing relay coil SP or UP so that at the proper time, a pulse indicating a delivered unit of gasoline can be produced in conductor 163 which is connected at any given instant to one or the other of the counting coils 132, 133.

Since the memory and pulsing circuits for each of the pulsers is identical, a typical operating cycle will now be described for an output from only the pulser 5. As explained above, each time a unit of gasoline is delivered by the pump, the contacts 155, 158 are momentarily closed permitting the capacitor 150 to discharge through the diode 164 and memory relay coil SM and thereby momentarily energize relay coil SM. The momentary energization of relay coil SM, however, closes the relay contact $SM_1$, and connects the relay coil SM to the bus bar 142 through normally closed relay contacts $SP_1$ provides a locking circuit for the relay coil SM. Relay coil SM also closes contacts $SM_2$ which then connects pulsing relay coil SP to one contact of a normally open switch $T_1$ of the scanning timer T. The scanning timer T, which is a continuously running A.C. motor having a cam shaft connected to its rotor, momentarily closes each of switches $T_1$, $T_2$ in sequence at a rate exceeding the minimum time possible between successive pulses from the pulsers 5, 6 respectively. In the instant example, when the switch $T_1$ is closed, a circuit from the bus bar 142 through closed relay contacts $SC_1$ (the purpose of which will be explained below), switch $T_1$, closed relay contacts $SM_2$, relay coil SP and resistor 165 to bus bar 143 is completed causing relay coil SP to become energized. Energization of the relay coil SP opens relay contacts $SP_1$, thereby de-energizing memory relay SM, and closing relay contacts $SP_2$ which then provide a locking circuit for relay coil SP has become completed, the capacitor 167 which is connected in parallel with resistor 165 begins to charge. After a period of time, the charge on the capacitor 167 is sufficient to bias the relay coil SP to such a value that it becomes de-energized, causing relay contacts $SP_2$ to open and break the locking circuit for relay SP. The capacitor 167 then discharges through the resistor 165 and places the memory and scanning circuitry in a condition to receive the next pulse from the pulser 5. During the period of time that the relay contacts $SP_2$ are closed, power also is applied to counting coil 132 of register 20 via the diode 168, conductor 163 and closed relay contact $IR_1$ of pulse routing relay coil IR. This has the effect of pulsing the counting coil 132 and thereby reducing the count in the register 20 by one. Counting coil 133 is not pulsed at this time since relay contacts $IR_2$ are open. Also connected to the conductor 163 is the totalizing register 16 which is also pulsed each time the conductor 163 is connected to the bus bar 142 and thereby increases its count by one. A normally closed switch 169 is connected between the totalizing register 16 and the bus bar 143. The switch 169 opens whenever the door of the cabinet containing the service station control circuitry is opened and prevents accidental pulsing of the register 16 during maintenance operations.

Pulses generated by the relay coils SP and UP continue to pulse counting coil 132 via conductor 163 and closed relay contacts $IR_1$ until such time as the register 20 shows a zero count. At that time the mechanical counter mechanism of the register 20 reverses the position of switch 134, completing a circuit from bus bar 142 through conductor 145, switch 134, conductor 173, closed contacts $LC_2$, pulse routing relay coil IR and resistor 174 to bus bar 143. It should be noted at this point that, although the energizing circuit for relay coil LC through switch 134 has been broken, relay coil LC still remains energized by means of a circuit including switch 135 of register 21. Simultaneously with the energization of relay coil IR, capacitor 175, which is connected across resistor 174, begins to build up a charge which, after a very short period of time, reduces the voltage across relay coil IR to such a value that it becomes effectively de-energized. Relay coil IR, which is a bistable switching relay, i.e., one which alternates all of its contacts when energized and then reverses the previous condition of all its contacts when subsequently re-energized, then opens contacts $IR_1$ and $IR_4$ and closes contacts $IR_2$ and $IR_3$; thereby conditioning register 21 to accept the meter pulses on conductor 163 and align register 20 to accept a reset command to coil 130 via $IR_3$ and relay contacts 95, 96 of receiver 39 (FIGURE 3). Reversal of the switch 134 also energizes the reserve warning light 28 which shows the service station dealer that it is time to order another preset quantity of gasoline from the marketing company.

If under the previously described conditions of the registers, i.e., register 20 showing a zero count and register 21 being responsive to the pulses on line 163, a release signal of frequency $f_2$ is received by the receiver 34 (FIGURE 3), the relay 116 is energized and the contacts 123 are closed. This completes a circuit from bus bar 142 through conductor 176, closed relay contacts $IR_3$ and reset coil 130 to bus bar 143 and subsequently resets register 20. The resetting of register 20 returns switch 134 to its reset or upper position. Since both switches 134, 135 are now in their reset or upper position, the path between conductor 173 and the bus bar 142 is broken and capacitor 175 can then discharge through the resistor 174. Once the capacitor 175 has discharged, the relay coil IR is again conditioned to be energized and alternate the contacts $IR_1$–$IR_4$ when the register 21 is reduced to zero. Disconnecting conductor 173 from bus bar 142 also results in the reserve warning light 28 being extinguished.

Also connected to the common junction of relay coil IR, resistor 174 and capacitor 175 is a circuit, consisting of relay contacts $LC_3$, conductor 177, relay contacts $TD_1$, diode 178 and resistor 179 which prevents the erroneous energization of relay coil IR when one of the registers 20, 21 has a zero count. While the erroneous energization of the relay coil IR and the subsequent reversal of the condition of relay contacts $IR_1$–$IR_4$ will present no problem when both registers 20, 21 have counts other than zero, reversal of the condition of relay contacts $IR_1$–$IR_4$ while one of the registers 20, 21 has a zero count results in the counting coil of the register 20 or 21 having a zero count being connected to the conductor 163. In the event of a power failure while one of the registers 20, 21 has a zero count, capacitor 175 becomes discharged. When the power is subsequently turned on, as explained above, time delay relay element TC, after a period of time, closes contacts $TC_1$; thereby energizing relay coil LC and closing contacts $LC_2$. Closure of contacts $LC_2$ connects relay IR across the bus bars 142, 143 through the switch 134 or 135 of the register 20 or 21 which has a zero count and would ordinarily energize relay coil IR resulting in the above mentioned problem. As soon as the power is turned on, however, capacitor 175 begins to charge through the circuit consisting of closed relay contacts $LC_3$, conductor 177, closed relay contacts $TD_1$, diode 178 and resistor 179. During the time delay period of relay element TC, capacitor 175 becomes sufficiently charged to prevent the energization of relay coil IR. As soon as the relay coil LC becomes energized, contacts $LC_3$ are opened and relay coil IR is then able to continue to be operated in the conventional manner.

In the event that both registers 20 and 21 have been reduced to a zero count, switches 134 and 135 are both in their lower or zero position. When this occurs, conductor 146 is disconnected from the bus bar 142 and relay coil LC is de-energized. De-energization of relay coil LC causes relay contacts $LC_1$ to open causing pump control relay coil PC to be de-energized and stopping the removal of any more product from the station storage tanks. De-energization of relay coil LC also opens contacts $LC_2$ which disconnects relay coil IR from bus bar 142, and closes contacts $LC_3$ causing relay element TD, which has a delay time equal to or greater than the delay time of relay element TC, to be energized and open contacts $TD_1$. The opening of contacts $TD_1$ allows capacitor 175 to discharge through resistor 176. Closure of the relay contacts $LC_3$ also energizes scanning control relay coil SC which will then open relay contacts $SC_1$ and disconnect the timer switches $T_1$, $T_2$ from the bus bar 142. This prevents the continuously running timer motor from de-energizing any of the memory relays SM, UM which might still be energized at the time both of the registers 20, 21 reach a zero count.

When a proper release signal is now received by the receiver 34 (FIGURE 3), contacts 123 will close and energize reset coil 131; thereby resetting register 21 and moving switch 135 to its reset or upper position. Resetting of the switch 135 applies power to time delay relay element TC which closes contacts $TC_1$ and energizes relay coil LC. The time delay introduced by the relay TC enables the register 21 to be fully reset before the relay coil LC in energized. Energization of relay coil LC results in the closing of contacts $LC_1$, thereby energizing the pump control relay coil PC, and the closing of contacts $LC_2$, thereby energizing relay IR through the switch 134 which is in the zero position. Relay IR then reserves the condition of contacts $IR_1$–$IR_4$ whereby the counting coil 133 of reset register 21 is then connected to receive pulses from the pulsing relay contacts $SP_2$ and $UP_2$ and the reset coil 130 of register 20 is armed to accept a reset pulse. Energization of relay coil LC also opens relay contacts $LC_3$ causing relay coil SC to be disconnected from the bus bar 142. Capacitor 180 then begins to discharge through relay coil SC and keeps relay coil SC energized for a period of time long enough for the relay coil IR to complete the switching of contacts $IR_1$–$IR_4$. After the relay coil SC becomes de-energized, contacts $SC_1$ close, connecting the timer switches $T_1$, $T_2$ to the bus bar 142 and thus enabling the timing motor T to read out the pulses stored in the memory relay coils SM and UM.

Although the system has been described for the inventory control of gasoline at a service station, it is understood that the system is not limited to this particular application but may be used to control any automatically dispensed product. For example, instead of a telephone line coupling the frequency selective receiver and transmitter, other forms of communications links may be used, i.e., radio, leased lines, etc.

Obviously, various modifications of the present invention are possible in the light of the above teachings. It is therefore to be understood that the invention is not limited to the particular form illustrated but is capable of embodiment in other forms without departing from the spirit and scope of the appended claims.

I claim as my invention:

1. A product inventory control system comprising: means for storing said product; means for delivering quantities of product from said storage means; a source of power normally connected to said means for delivering quantities of product; pulsing means coupled to said means for delivering quanties of product for producing a pulse each time a preset quantity of product is delivered; preset register means coupled to the output of said pulsing means, said register means reducing its count by one for each pulse received from said pulsing means; a reset means, said reset means being coupled to said register means for resetting said register means when it has reached a zero count, said reset means being responsive to an electric pulse; frequency-selective receiver means coupled to said reset means for producing an output pulse each time a signal of a predetermined frequency is received; a remotely located transmitter for selectively transmitting a signal of said predetermined frequency; a communications link coupling said transmitter to said receiver means; and control circuit means coupled to said register means for disconnecting said source of power from said means for delivering quantities of product whenever said register means has a zero count.

2. A product inventory control system comprising: a storage tank for storing said product; a plurality of pumps for delivering quantities of product from said storage tank; a separate pulsing means on each of said pumps, each of said pulsing means producing a pulse each time a preset quantity of product is delivered by its corresponding pump; a plurality of storage means for storing said pulses, each of said storage means being coupled to the output of a different one of said pulsing means; means coupled to said plurality of storage means for sequentially scanning said storage means, and producing a series of pulses related to the number of stored pulses; preset register means coupled to the output of said scanning means for producing a count related to the number of pulses received; a source of power normally connected to said pumps; and, means coupled to said register means for disconnecting said source of power from said pumps when said register means has reached a predetermined count.

3. The apparatus of claim 2 including a second register means connected to the output of said scanning means and responsive to said scanning means output pulses for indicating the total quantity of product pumped from said storage tank.

4. The apparatus of claim 2 including means for resetting said preset register means when it has reached said predetermined count comprising: a reset coil in said register means; frequency selective receiver means coupled to said reset coil for producing a reset pulse upon receipt of a signal of a predetermined frequency; a remotely located transmitter for selectively producing signals of said predetermined frequency; and, means for coupling the output of said transmitter to said receiver means.

5. The apparatus of claim 4 wherein said frequency selective receiver includes means for detecting said signal of a predetermined frequency and producing an output signal; and, means responsive to said output signal exceeding a predetermined time duration for producing said reset pulse.

6. The apparatus of claim 2 wherein said register means includes a plurality of registers; a pulse routing circuit connected to the output of said scanning means for connecting the output of said scanning means to one of said plurality of registers; and, means responsive to said one of said registers reaching said predetermined count for causing said pulse routing circuit to connect the second of said registers to the output of said scanning means.

7. The apparatus of claim 6 including means for resetting said registers after they have reached said predetermined count comprising: a remotely located transmitter for selectively producing signals of a predetermined frequency; frequency selective receiver means responsive to said predetermined frequency signal for producing a reset pulse; a reset pulse routing circuit connected to the output of receiver means and responsive to the conditions of said plurality of registers for connecting said receiver means to the one of said registers which is not connected to the output of said scanning means.

8. The apparatus of claim 6 wherein said scanning means destructively reads out the pulses stored in each of said storage means; and means responsive to all of said registers reaching said predetermined count for preventing said scanning means from reading out the information stored in said storage means.

9. The apparatus of claim 6 including a normally inoperative warning indicator, and, means responsive to one of said registers reaching said predetermined count for causing said indicator to become operative.

10. A product inventory control system comprising: first and second storage means; first and second delivery means for delivering quantities of product from said first and second storage means respectively; first and second pulsing means coupled to said first and second delivery means respectively, said pulsing means producing a pulse each time a preset quantity of product is delivered by its respective delivery means; a first memory circuit coupled to the output of said first pulsing means for storing the output pulses from said first pulsing means; a second memory circuit coupled to the output of said second pulsing means for storing the output pulses from said second pulsing means; scanning means for sequentially scanning said first and said second memory circuits and producing a first and a second series of pulses corresponding to said pulses stored in said first and second memory means respectively; a first preset register means coupled to the output of said scanning means and responsive to said first series of pulses for counting said first series of pulses; a second preset register means coupled to the output of said scanning means and responsive to said second series of pulses for counting said second series of pulses; a source of power normally connected to said first and second delivery means; first circuit means coupled to said first register means for disconnecting said source of power from said first delivery means when said first register means reaches a predetermined count; and second circuit means coupled to said second register means for disconnecting said source of power from said second delivery means when said second register means reaches a predetermined count.

11. The apparatus of claim 10 including means to reset said register means after they have reached the said predetermined counts comprising: a first reset means coupled to said first register means; a second reset means coupled to said second register means, said first and second reset means being responsive to a single electrical pulse for resetting their respective registers; a frequency selective receiver having a first output terminal coupled to said first reset means and a second output terminal coupled to said second reset means; means included in said receiver for producing a reset pulse at said first output terminal upon receipt of a signal of a predetermined frequency by said receiver; means included in said receiver for producing an output pulse at said second output terminal upon receipt of a signal of a second predetermined frequency by said receiver; and, a remotely located transmitter means coupled to said receiver for selectively transmitting a signal of said first or said second predetermined frequency.

References Cited by the Examiner

UNITED STATES PATENTS

| | | | |
|---|---|---|---|
| 1,742,285 | 1/1930 | Shannon | 179—2 X |
| 2,437,326 | 3/1948 | Lewis | 179—2 |
| 3,030,015 | 4/1962 | Wieslander et al. | 340—149 X |
| 3,088,315 | 5/1963 | Withers | 235—151.34 X |

MALCOLM A. MORRISON, *Primary Examiner.*

S. J. SARLI, J. RUGGIERO, *Assistant Examiners.*